W. Sprague,
Harvester Rake.
No. 2017.  
33,021
Patented Aug. 6, 1861.
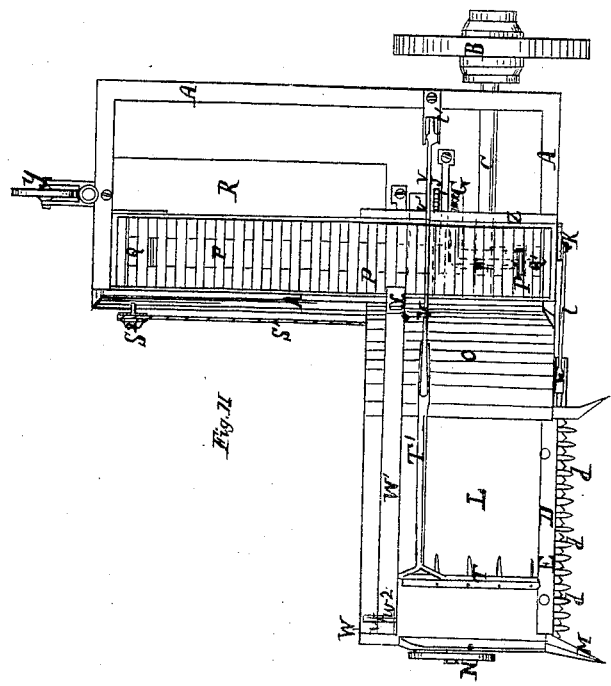
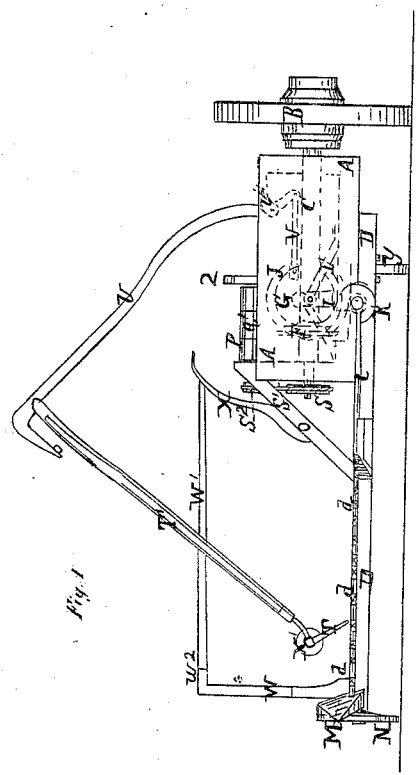

UNITED STATES PATENT OFFICE.

WELCOME SPRAGUE, OF FARNHAM, ASSIGNOR TO HIMSELF, AND DANL. E. BARKER AND WM. VAN DUZER, OF ANGOLA, NEW YORK.

IMPROVEMENT IN REAPING-MACHINES.

Specification forming part of Letters Patent No. 33,021, dated August 6, 1861.

*To all whom it may concern:*

Be it known that I, WELCOME SPRAGUE, of Farnham, Erie county, State of New York, have invented certain new and useful Improvements in Reaping-Machines; and I do hereby declare that the following is a full, clear, and exact description thereof, reference being had to the accompanying drawings and the letters of reference marked thereon, in which—

Figure I is a front elevation of my improved machine, and Fig. II is a plan of the same.

The nature of my invention consists in the combination and arrangement of a self-acting rake for removing the cut grain from the platform, a binder's stand and table, and an endless apron for carrying the grain to the binder, so that the grain may be bound by hand upon the machine.

Letters of like name and kind refer to like parts in each of the figures.

A represents the main frame of the machine.

B represents the driving-wheel, placed on the outside of the main frame.

C represents the driving-wheel shaft, having bearings in the side pieces of the main frame.

D represents the finger-bar to which the guard-fingers $d$ are connected. The bar is connected to the front of the machine, as represented.

E represents the cutter-bar.

F represents a bevel spur-wheel keyed onto the main driving-shaft C, and gearing in with the bevel-wheel G, whose shaft has journal-bearings in the standards I and I'.

J is a spur-wheel upon the shaft of the bevel-wheel G, which gears with a pinion on the crank-shaft K, which gives motion through the connecting-rod $l$ to the cutters.

L represents the grain-platform, with a divider, M, and carrying-wheel N.

$o$ is an inclined plane rising from the inner end of the platform to the top of the main frame and the level of the endless apron P.

P is an endless apron lying adjacent and parallel to the inner side piece of the main frame, above and out of the way of the gearing, and revolving upon the shafts Q and Q'.

R is a binding-table placed at the side of the apron.

S is a pulley on the inner end of the main driving-shaft C, from which motion is given to the endless apron by the belt S' and pulley $S^2$ upon the end of the shaft Q.

T represents a rake having a long handle, T', the end of which is hinged to the longer arm of the lever U.

U is a lever, which has a fulcrum upon the side piece of the main frame, as shown at U'.

V is a connecting-rod connecting the lower end of the shorter arm of the lever with the wrist $v'$, projecting from the face of the spur-wheel J, and by which a vibratory motion is given to the lever, which gives the proper motion to the rake.

W is a post projecting upward from the rear outside corner of the platform.

W' is a bar, one end of which is hinged to the upper end of the post, as shown at $w^2$, the other resting upon the stationary cam-face X, bolted to the inclined plane O.

X' is a friction-pulley upon the rear end of the rake.

Y is a caster-wheel which supports the weight of the binder and the rear of the frame.

Operation: The working of the gearing and cutting apparatus is too well-known to need further mention. The rake, being put in motion, will slide from the outside inward, carrying the grain upon the platform with it and up the inclined plane O, and deposit it upon the apron P, the guard Z preventing it from passing over and off from the apron. As the rake passes up the inclined plane the friction-wheel X' will ride upon the cam-face X, and, striking the under side of the bar W', raise it, the bar falling again as soon as the wheel passes its end. The lever U will by this time have reached the extent of its vibration in that direction, and as it moves back the friction-wheel X' will roll upon the top of the bar, carrying the rake above the grain falling upon the platform until it reaches the extent of it movement, when it will drop down outside of the post W upon the platform, ready to carry the next bundle of grain to the apron. The grain, as it falls upon the apron, is carried along to the binder, who stands ready for it, and draws the bundle from the apron upon the table R and binds it and throws it to the ground. A platform may be made on the opposite side of the apron for an additional binder to stand upon, should it be necessary.

What I claim is—

The combination and arrangement of the self-acting rake T, for removing the cut grain from the platform, a binder's stand and table R, and an endless apron, P, for carrying the grain to the binder, so that the grain may be bound by hand upon the machine, substantially as herein set forth.

WELCOME SPRAGUE.

Witnesses:
W. H. FORBUSH,
ALEX. KOCHBE.